United States Patent
Crinon

(10) Patent No.: US 7,188,353 B1
(45) Date of Patent: Mar. 6, 2007

(54) SYSTEM FOR PRESENTING SYNCHRONIZED HTML DOCUMENTS IN DIGITAL TELEVISION RECEIVERS

(75) Inventor: Regis J. Crinon, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/287,402

(22) Filed: Apr. 6, 1999

(51) Int. Cl.
  H04N 7/10 (2006.01)
  H04N 7/18 (2006.01)
  H04N 7/173 (2006.01)
  G06F 15/00 (2006.01)
  G06F 17/00 (2006.01)

(52) U.S. Cl. ............... 725/32; 725/82; 725/86; 725/135; 715/500.1; 715/501.1

(58) Field of Classification Search ............ 725/32, 725/110, 136, 116, 139, 86, 82, 135–137, 725/500.1, 501.1; 375/240.26; 348/425.1, 348/425.3, 460, 500, 512–513; 370/534–538; 345/715–717; 709/235–237, 219
See application file for complete search history.

(56) References Cited

U.S. PATENT DOCUMENTS

| | | | |
|---|---|---|---|
| 5,155,806 A | 10/1992 | Hoeber et al. | |
| 5,440,678 A | 8/1995 | Eisen et al. | |
| 5,467,288 A | 11/1995 | Fasciano et al. | |
| 5,521,927 A | 5/1996 | Kim et al. | 370/94.2 |
| 5,537,528 A | 7/1996 | Takahashi et al. | |
| 5,539,471 A | 7/1996 | Myhrvoid et al. | |
| 5,539,871 A | 7/1996 | Gibson | |
| 5,541,662 A * | 7/1996 | Adams et al. | 348/460 |
| 5,553,221 A | 9/1996 | Reimer et al. | |
| 5,559,949 A | 9/1996 | Reimer et al. | |
| 5,559,999 A | 9/1996 | Maturi et al. | 395/550 |
| 5,594,504 A | 1/1997 | Ebrahimi | |
| 5,596,581 A | 1/1997 | Saeijs et al. | 370/394 |
| 5,596,705 A | 1/1997 | Reimer et al. | |
| 5,598,352 A | 1/1997 | Rosenau et al. | 364/514 A |
| 5,598,415 A | 1/1997 | Nuber et al. | 370/474 |
| 5,600,775 A | 2/1997 | King et al. | |

(Continued)

FOREIGN PATENT DOCUMENTS

WO  WO 97/12342  4/1997

OTHER PUBLICATIONS

Wugofski, Ted, *Synchronization and Transitions in Broadcast HTML,*, Over the Moon Productions, Inc., Feb. 1988.
ISO/IEC JTC1/SC29/WG11 N1508, *Coding of Motion Pictures and Audio*, Feb. 1997.
ISO/IEC JTC 1/SC 29 N 1941, *Coding of Audio, Picture, Multimedia and Hypermedia Information*, Mar. 6, 1997.
ISO/IEC JTC1/SC29/WG11 N 1716, *Coding of Motion Pictures and Audio*, Jul. 1997.

*Primary Examiner*—Hai Tran
(74) *Attorney, Agent, or Firm*—Chernoff, Vilhauer, McClung & Stenzel

(57) ABSTRACT

A method and apparatus is provided for synchronizing display of HTML documents to the audio/video content of a digital television program. Documents are authored with a structure for receiving a presentation time stamp value. After the packetized data representing the document is received at the television receiver, the document is reconstructed, and the value of the presentation time stamp is inserted in the structure in the document. The broadcast HTML formatted document, including the time stamp value, can be read by a broadcast HTML cognizant browser which notifies the program viewer or displays the document at the time specified by the time stamp.

14 Claims, 2 Drawing Sheets

U.S. PATENT DOCUMENTS

| | | |
|---|---|---|
| 5,611,036 A | 3/1997 | Berend et al. |
| 5,642,171 A | 6/1997 | Baumgartner et al. |
| 5,650,825 A | 7/1997 | Naimpally et al. ......... 368/465 |
| 5,699,392 A | 12/1997 | Dokic ......................... 375/326 |
| 5,708,845 A | 1/1998 | Wistendahl et al. |
| 5,726,989 A | 3/1998 | Dokic ......................... 370/509 |
| 5,727,141 A | 3/1998 | Hoddie et al. |
| 5,745,909 A | 4/1998 | Perlman et al. ............. 709/513 |
| 5,748,188 A | 5/1998 | Hu et al. .................... 345/326 |
| 5,815,634 A | 9/1998 | Daum et al. ................. 386/36 |
| 5,818,441 A * | 10/1998 | Throckmorton et al. .... 345/717 |
| 5,832,495 A | 11/1998 | Gustman |
| 5,862,260 A | 1/1999 | Rhoads |
| 5,931,908 A * | 8/1999 | Gerba et al. ................ 709/219 |
| 5,946,419 A | 8/1999 | Chen et al. |
| 5,969,755 A | 10/1999 | Courtney |
| 5,982,445 A * | 11/1999 | Eyer ........................... 348/461 |
| 6,064,420 A * | 5/2000 | Harrison et al. ............ 725/136 |
| 6,223,213 B1* | 4/2001 | Cleron ....................... 709/206 |
| 6,240,555 B1* | 5/2001 | Shoff ......................... 725/110 |
| 6,269,107 B1* | 7/2001 | Jong .......................... 370/535 |
| 6,295,647 B1* | 9/2001 | Ramaswamy ............... 725/116 |
| 6,317,885 B1* | 11/2001 | Fries .......................... 725/109 |
| 6,323,909 B1* | 11/2001 | Michener et al. ........... 348/512 |
| 6,357,042 B2* | 3/2002 | Srinivasan .................... 725/32 |
| 6,421,359 B1* | 7/2002 | Bennett et al. .............. 370/538 |
| 6,460,086 B1* | 10/2002 | Swaminathan et al. ..... 709/236 |

* cited by examiner

SYSTEM FOR PRESENTING SYNCHRONIZED HTML DOCUMENTS IN DIGITAL TELEVISION RECEIVERS

BACKGROUND OF THE INVENTION

The present invention relates to digital television and, more particularly, to a system for displaying electronic documents synchronized to the audio/video content of a digital television program.

A digital television system includes a transmitter and receiver pair. The transmitter system includes subsystems to receive and compress digital source data; the data streams representing a program's audio, video, and ancillary data elements; multiplex the data from the several source streams into a single transport bit stream; and transmit the data to the receiver. At the receiver the transport bit stream is demultiplexed into its constituent elementary data streams. The elementary data streams are decompressed and the audio and video data streams are delivered as synchronized program elements to the receiver's presentation subsystem for display as a coordinated television program. The digital television system is described by the *ATSC Digital Television Standard*, Advanced Television Systems Committee, Doc A/53, 12 Apr. 1995, 16 Sep. 1995, incorporated by reference herein. The system employs the MPEG-2 systems and video stream syntax of ISO/IEC IS 13818-1 & 2, *Information Technology—Generic Coding of Moving Pictures and Associated Audio Information*, International Standards Organization, First Edition, 1996, 15 April 1996 and 15 May 1996, respectively, 16 Sep. 1995, incorporated by reference herein. Audio coding is in accordance with the *Digital Audio Compression Standard (AC-3)*, Advanced Television Systems Committee, Doc A/52, 16 Nov. 1994, 20 Dec. 1995 16 Sep. 1995, incorporated by reference herein.

In addition to the basic audio and video program content, the digital television system provides for transmitting ancillary data services. Ancillary data services can include control data; conditional access control data associated with limited access to scrambled signals; and data associated with program audio and video services such as "closed captioning," emergency broadcasts, and an optional program guide containing information about the programs being transmitted or to be transmitted. The suite of ATSC digital television standards will also include a specification for data broadcast services to be drafted by the T3S13 working group of the Advanced Television Systems Committee. The data broadcast services specification is expected to include mechanisms for synchronization of broadcast data services with the audio/video content of a television program.

Some ancillary data services for digital television may be facilitated by transmitting electronic documents similar to those transmitted over the World Wide Web and displayed by a web browser. These documents could be similar or identical to the HyperText Markup Language (HTML) formatted documents delivered over the Internet. Proposals for future revisions of HTML include a HyperText Markup Language for broadcast applications (bHTML) as described in "A Modular Hypertext Markup Language for Broadcast Application"; Draft 4; Wugofski, Ted; Over the Moon Productions; 1998. Among the changes proposed to make HTML more suitable for broadcast applications is the addition of structures related to time sensitive delivery of documents. Heretofore, HTML formatted documents may be transmitted using delivery time insensitive asynchronous protocols, such as the Internet protocol. For digital television it is desirable that documents are also capable of being displayed in a time sensitive manner. A document might be displayed in a synchronized mode, that is, the display of the document is coordinated with certain audio or video program content. On the other hand, the document might be displayed in a synchronous mode where the display of the document occurs at a specified time but the document's display not synchronized to the program content being displayed at that time.

To facilitate time sensitive delivery of HTML formatted documents temporal structures have been proposed as additions to the bHTML language. A paper; "Synchronization and Transition in Broadcast HTML" Addendum Version 1.0 to bHTML Draft 4; Wugofski, Ted; Over the Moon Productions; 1998; proposes expanding the bHTML syntax to include features related to timing, synchronization, and the transition of objects entering and exiting the display. Using the proposed timing features the author of a bHTML formatted document could specify in the document whether display of a HTML object would be based on time. To facilitate time based operation, the proposal includes tags which permit the document's author to identify a clock source and specify the reference value of that clock source when the time based event (for example, "start display") is to occur.

The proposal identifies the system clock of the platform executing the decoding and rendering of the document as the default clock source. While the digital television receiver includes a clock, the present inventor has realized that it is not sufficiently accurate to be useful in close synchronization of the display of documents and program audio/video content. Further, potential differences in local time at the receiver, the transmitter, and the location where the program's content is authored would make synchronization of audio/video and data services based on the receiver's "clock" time very difficult.

The bHTML timing and synchronization proposal permits the document's author to identify a clock source other than the system clock. These clock sources could include a frame rate, a field rate, or a presentation time stamp. The digital television system relies on a 90 kHz MPEG-2 system clock for synchronization of the encoder and a decoder of the system. The digital television receiver reconstructs the system clock from Program Clock References (PCRs) which are transmitted with the data stream. In addition, presentation time stamps (PTS) are inserted in the elementary data streams before transmission to synchronize the display of audio and video elements of the program. The PTS is included at regular intervals in the header of video and audio data packets when the packets are encoded. The decompression and presentation systems of the receiver utilize the time stamps to synchronize the display of the reconstructed video and audio program elements. According to the bHTML proposal, a PTS reference value could be specified in the document. When the referenced PTS value is detected in the data stream, the document would be displayed.

While the bHTML proposal provides a structure internal to a document for specifying a PTS value, it does not suggest how synchronization might be implemented in a digital television system. The PTS is an encoding of absolute time, synchronous to the clock of the video or audio encoder, which is inserted into the elementary data streams of the program elements by the program multiplexer of the transmitter. The PTS values are only meaningful if the internal time base of the system encoder is known. In other words, the PTS does not specify time in any usual sense. The author of a document will not be able specify a PTS reference in the document when the document is authored because there is no way of determining the value of the PTS at some time in the future when the audio or video content to which the document is to be synchronized will pass through the program multiplexer. On the other hand, the program multiplexer does not have the capability or the time to parse the HTML document and insert a PTS reference in the document after the correct reference is determined.

The document could be transmitted asynchronously and stored at the receiver. When a special synchronization mark in the program video was detected, the document could be retrieved from storage and displayed. However, this would require parsing and buffering of the video to detect the synchronization mark and retrieve the document in sufficient time to be synchronized to the datum in the video. This would complicate the receiver and significantly increase its cost.

Since the PTS is available in the data stream at the receiver, a data presentation engine could recover the PTS for the data packet that contains the document and cause the document to be displayed at the appropriate time. However, this data presentation engine would be significantly different from the standard World Wide Web browser which can interpret the HTML tags within a document but is incapable of retrieving the PTS from the data stream for use in synchronizing display of the document.

What is desired, therefore, is a system for synchronizing the display of bHTML coded documents transmitted as part of the synchronized data services of a digital television system utilizing the proposed functions of Broadcast HTML.

SUMMARY OF THE INVENTION

The present invention overcomes the aforementioned drawbacks of the prior art by providing a method and apparatus utilizing presentation time stamps to synchronize display of a document by a bHTML cognizant browser with the audio/video elements of a digital television program. In a first aspect of the invention a method is provided for displaying a document together with a time stamp specified display of a video element comprising the steps of providing the document including a structure for receiving a time stamp value associated with the video element; inserting the time stamp value that associates the document with the video element in the structure in the document; reading the time stamp value in the document; and either providing or signaling the availability of the document to a viewer in accordance with the time stamp value.

In a second aspect of the invention an apparatus is provided for displaying a document with a video or audio element of a video comprising a document server for delivering the document including a structure for receiving a time stamp value as a first data stream to a packet assembler, the delivery being coordinated with the arrival of a target datum in a second data stream representing an audio or video program element; a packet assembler for encoding a data packet comprising a first data unit representing the document and a time stamp value specifying a time for displaying the document and a second data packet comprising the target datum and the time stamp value; a packet disassembler for separating the data unit and the time stamp value from the first data packet; a parser to reconstruct the document from the data unit; a time stamp loader to insert the time stamp value into the structure for receiving the time stamp value; and a data presentation engine to read the document and signal a viewer of the availability of the document for display at the time specified by the time stamp value.

The method and apparatus of the present invention utilize the presentation time stamps (PTS) inserted in the packetized data streams of program elements for synchronization of the audio and video elements of the program to synchronize the display of bHTML formatted documents with the program elements. The document is authored with a structure than can receive a PTS value. The PTS is inserted into this structure before the document is displayed. The author of the document does not need to know the PTS prior to transmission and the program multiplexer is not required to the parse the document and insert the PTS prior to packetizing the data. Since the PTS is inserted into the reconstituted document a standard bHTML cognizant browser can be used to read the PTS reference value and notify the viewer of the availability of the document at the time specified in by PTS value. To support this functionality, the MPEG-2 system clock derived from the transmitted PCRs is made available to the bHTML browser.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
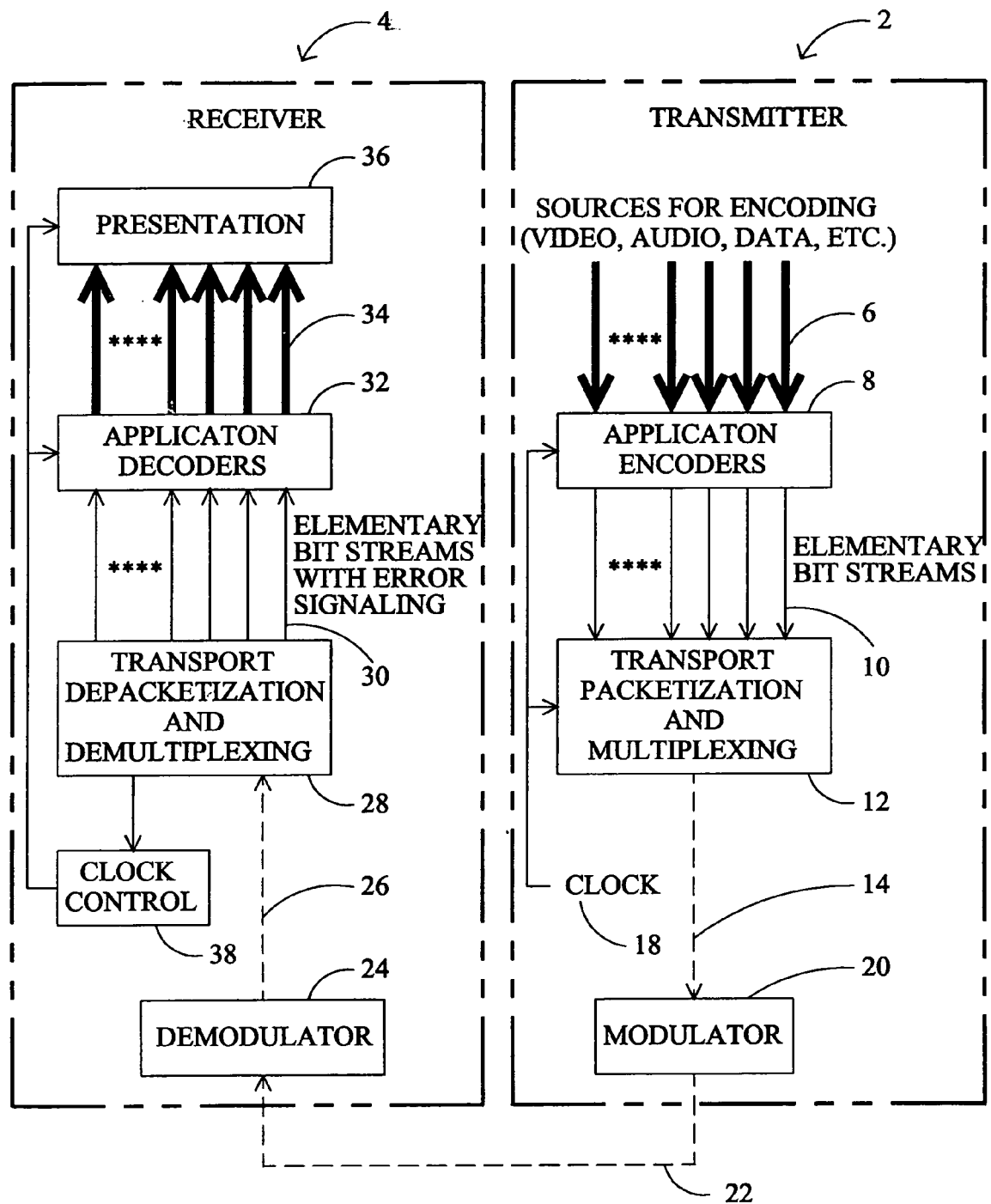
FIG. 1 is a block diagram of a digital television transmitter and receiver pair.

Referring to FIG. 1, a digital television system comprises a transmitter 2 and a receiver 4 pair. The transmitter 2 includes facilities to receive a plurality of streams of digital source data 6, each stream representing a video, audio, or ancillary data element of a television program. Ancillary data includes control data, conditional access data which scrambles the program unless the decoder has the proper key, and data associated with program audio and video services, such as a program guide, emergency messages, and "closed captioning" services. Ancillary data may also include independent program data services which may be synchronized to the audio/video content of the television program.

In the transmitter 2 the source data streams 6 are processed in the application encoders 8 which perform data compression and formatting to reduce the bit rate that must be transmitted. The digital television system employs compression techniques from the MPEG-2 toolkit and the video stream syntax specified in the MPEG-2 standard, ISO/IEC DIS 13818-1 & 2, *Information Technology—Generic Coding of Moving Pictures and Associated Audio Information*, International Standards Organization, First Edition, Apr. 15, 1996 and May 15, 1996, respectively. Audio coding is in accordance with the ATSC, *Digital Audio Compression Standard (AC-3)*, Advanced Television Systems Committee, Doc A/52, 16 Nov. 94, 20 Dec. 95. The auxiliary synchronized, synchronous, and asynchronous data elementary streams are encoded according to the protocol encapsulation defined in the ATSC T3S13 working group draft specification for data broadcast services. The compressed and formatted elementary bit streams 10 are passed to the transport packetization and multiplexing subsystem 12 where each of the elementary data streams 10 is divided into packets. Timing information is included in the packets of the elementary streams and the several packetized elementary streams are multiplexed into a single transport bit stream 14. The data compression and packetization are synchronized by a system clock 18. The transport bit stream 14 is passed to a modulator subsystem 20 for transmission. In terrestrial broadcast television the modulator subsystem 20 may be a radio frequency transmission system which uses the digital data in the transport stream to modulate a transmitted signal 22. Other modulator systems could be used for satellite or cable transmission.

The transmitted signal 22 is received by a demodulator subsystem 24 in the receiver 4. The transport bit stream 26 with error signaling is forwarded to the transport depacketization and demultiplexing subsystem 28 where the elementary bit streams 30 for each of the program elements are demultiplexed and recovered from the transport data stream 26. In the application decoders 32 streams of elementary audio, video, and ancillary data are decompressed and reassembled into elementary streams 34. The elementary data streams 34 are forwarded to the presentation subsystem 36 for display, sound generation or other action. Decompression and presentation of the program elements are coordinated by a clock control 38 which is derived from the program clock references (PCRs) recovered from the transport data stream 26.

Figure 2:
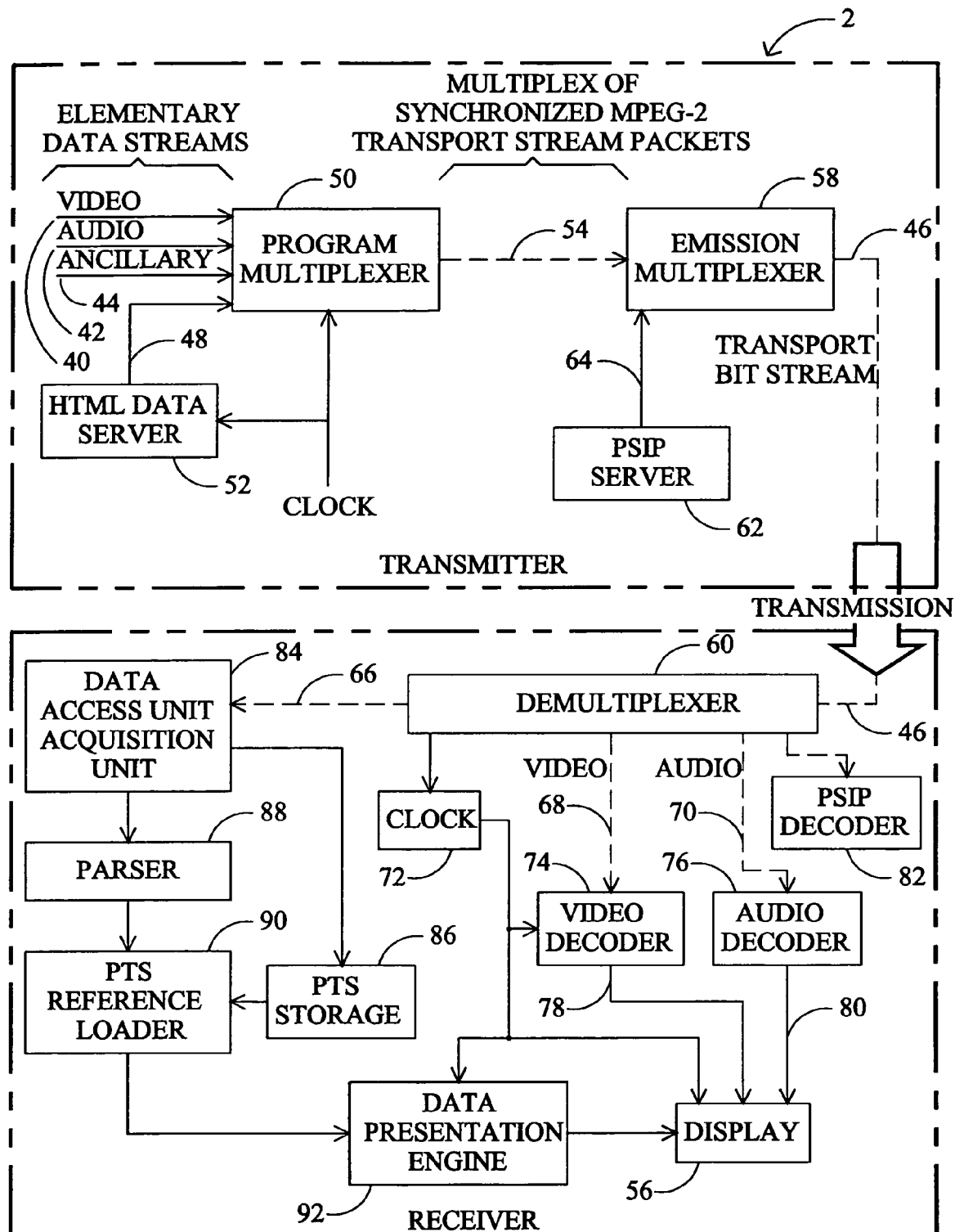
FIG. 2 is a block diagram of a transport packetizing and multiplexing subsystem of a digital television transmitter and a depacketizing and document reconstitution subsystem of a digital television receiver.

Referring to FIG. 2, in the transport packetization and multiplexing subsystem of the transmitter 2 the incoming compressed and formatted video 40, audio 42, and ancillary 44 and 48 elementary data streams from application encoders are collected and multiplexed into the MPEG-2 transport packets of the transport bit stream 46. The video, audio, and data packetized elementary streams comprise a continuous series of video, audio, and data access units, respectively. An access unit represents a unit of information tied to a particular presentation time which may or may not be explicitly specified by a presentation time stamp (PTS). For example, each frame of video is mapped to a single access unit and each synchronized HTML document is mapped to a single data access unit. In the system of the present invention at least one ancillary data stream 48 may include data representing HTML coded electronic documents which are pushed to the program multiplexer 50 by a HTML data server 52. If the document is to be synchronized with the audio/video content of the television program, the program's content provider will have inserted a bHTML timing tag in the document identifying the presentation time stamp as the source of the time reference value. The author will also have provided a receptacle for the presentation time stamp reference value in the document. This would be accomplished by including the structure in the document with a field for the time stamp reference value. For example, to start the display of a document the structure might be: style="begin:pts( )." The document may include other bHTML structures defining the transition and synchronizing the elements of the document. In addition, the proposed bHTML language includes structures to specify the life time or duration of display of the document. The document might include a time tag specifying duration of document display as a period to be added to the PTS reference in the document. The content provider will also have specified that HTML server 52 is to push the document to the program multiplexer 50 at a time coordinated with the arrival of the target datum (for example, a particular video frame) in the source audio 42 or video 40 elementary streams. The target datum may be a video element such as a group of frames, a portion of a group of frames, a frame, a field or an object. Likewise, the target datum might be an audio element, such as a phrase, a word, a note, a song, or a sound.

In the program multiplexer 50 the successive access units are divided into MPEG-2 transport packets. Each packetized elementary stream packet is assembled from an access or presentation unit and a header which includes timing information specific to the elementary stream. The timing information includes a presentation time stamp (PTS) and may include a decode time stamp (DTS) which provide directions to the decompression and display hardware. The PTS is a sample of the 27-MHZ system reference clock divided by 300. The Program Clock References (PCRs) which allow a receiver to reconstruct the system clock are typically inserted in the packetized elementary stream. All other elements of the program utilize the MPEG-2 system clock derived from this single reference clock to control display and thus all the program elements will be synchronized. The PTS provides the correct "clock on the wall" time for a properly timed presentation of the data in the access unit at the display even though transport time for data from individual streams may vary due to multiplexing. Capturing the PTS in each of the data streams representing the program elements to be synchronized causes the display of elementary data to be synchronized at the receiver 4. Each packet contains an encoded document to be presented and the presentation time stamp indicating the corresponding video instant with which it is associated.

In the emission multiplexer 58 the packetized elementary data streams 54 are multiplexed into a single transport bit stream 46 with fixed length packets (188 bytes per ISO/IEC 13818-1 specification). Packet identification is added to the packet payload to assemble the packets of the transport bit stream 46. One or more asynchronous bit streams 62 are also added to the transport bit stream 46 by the emission multiplexer 58. An example of such an asynchronous bit stream is the Program and System Information Protocol (PSIP) which are pushed to the emission multiplexer 58 by the PSIP server 64. The transport bit stream 46 is forwarded to the transmission subsystem and transmitted to a receiver 4.

At the receiver 4 the transport bit stream 46, with an error signal, is broken into its constituent packetized elementary data streams 66, 68 and 70 by the demultiplexer 60. The demultiplexer 60 also recovers the program clock reference (PCR) from the transport data stream packet headers so that the system clock 72 can be recovered at the receiver and used in synchronizing the decompression and display of the video, audio, and data access units. Video 68 and audio 70 data streams are passed to the video 74 and audio 76 decoders for decompression to elementary video 78 and audio 80 data streams which are passed to the display 56. Likewise, the Program and System Information Protocol (PSIP) is recovered from the transport bit stream 46 and reconstructed by the PSIP decoder 82. The recovered PSIP information includes identification of the location of the Service Description Information in the transport bit stream 46. The Service Description Information is transmitted as part of the data broadcast service and is used to locate and identify the elements of the data stream conveying the bHTML formatted document. The data access unit representing the HTML document is reconstructed by disassembling the packetized elementary stream packet in the data access unit acquisition unit 84. The presentation time stamp (PTS) is also separated from the packet header and stored in the PTS storage 86. The data access unit is passed to a parser 88 where the HTML document is reconstructed. If the display of the document is to be synchronized, the HTML timing tag structure to receive the time stamp value will be detected in the document. When a HTML timing tag is detected, the stored value of the PTS reference is loaded into the PTS reference field of the timing tag by the PTS reference loader 90. The resulting document with a timing tag having the value of the stored presentation time stamp is sent to the data presentation engine 92 which may include a standard bHTML cognizant Internet browser. The data presentation engine 92 reads the bHTML code and presents the document to the display 56 at the time established by the PTS reference value specified in the document.

In another aspect of the invention the reconstructed document is stored in a local file and the availability of the document for display is signaled by an icon or other notice displayed by the presentation engine 92 at the time established by the PTS value specified in the document. The program viewer can request the display of the document by issuing a command to the presentation engine 92.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of displaying a document together with a first time stamp specified display of a video element comprising the steps of:
   (a) a transmitter providing said document wherein said document includes a structure for receiving a first time stamp value associated with said video element in a packetized elementary stream, wherein the combination of said document and said structure for receiving said first time stamp value is provided in a packetized elementary stream together with an associated presentation time stamp value;
   (b) a receiver inserting said presentation time stamp value into said structure;
   (c) reading said presentation time stamp value in said document; and
   (d) at least one of providing and signaling the availability of said document to a viewer in accordance with said presentation time stamp value.

2. The method of claim 1 wherein said availability of said document is signaled by displaying said document.

3. The method of claim 1 wherein said availability of said document is signaled by displaying to said viewer a notice of said availability to which said viewer may respond by causing said display of said document.

4. The method of claim 1 wherein said presentation time stamp value is encoded in a data packet with said document before said data packet is transmitted.

5. The method of claim 1 wherein said presentation time stamp value is inserted into said structure after said document is transmitted.

6. A method of displaying a document together with at least one of a video element and an audio element of a video comprising:
   (a) providing said document wherein said document includes a structure for receiving a first time stamp value specifying a display time for said document;
   (b) encoding in a packetized elementary stream a first data packet comprising a payload containing said document together with an associated presentation time stamp value located apart from said structure;
   (c) encoding in a packetized elementary stream a second data packet comprising said first time stamp value and a target datum in said at least one of said video element and said audio element;
   (d) reconstructing said document from said first data packet;
   (e) capturing said presentation time stamp value from said first data packet;
   (f) inserting said presentation time stamp value into said structure for receiving said first time stamp value;
   (g) reading said presentation time stamp value in said document; and
   (h) at least one of providing and signaling the availability of said document to a viewer and displaying said target datum of said at least one of said video element and said audio element at said display time specified by said presentation time stamp value.

7. The method of claim 6 wherein the presence of said document is signaled by displaying said document.

8. The method of claim 7 further comprising the steps of:
   (a) including in said document a display time interval; and
   (b) terminating said display of said document at a time specified by said display time interval and said time stamp value.

9. The method of claim 6 wherein the presence of said document is signaled by displaying a command by which said viewer can cause said document to be displayed.

10. The method of claim 6 further comprising transmitting said first and second data packets to a receiver.

11. An apparatus for displaying a document together with at least one of a video and an audio element of a video comprising:
    (a) a document server for delivering said document wherein said document includes a structure for receiving a first time stamp value as a first data stream to a packet assembler said delivery being coordinated with the arrival of a target datum in a second data stream representing said at least one of a video element and an audio element;
    (b) said packet assembler for encoding in a packetized elementary stream a first data packet having, together with an associated presentation time stamp value not within said structure, a payload comprising a data unit representing said document and said first time stamp value specifying a time for displaying said document and a second data packet comprising said target datum and said first time stamp value;
    (c) a packet disassembler for separating said data unit and said first time stamp value from said first data packet;
    (d) a parser to reconstruct said document from said data unit;
    (e) a time stamp loader to insert said presentation time stamp value into said structure for receiving said first time stamp value; and
    (f) a data presentation engine to read said document and signal a viewer of the availability of said document at said time specified by said first time stamp value.

12. The apparatus of claim 11 wherein the availability of said document is signaled by displaying said document on a display.

13. The apparatus of claim 11 further comprising:
    (a) a storage device to store said reconstructed document; and
    (b) a command device enabling said viewer to cause the display of said document.

14. The apparatus of claim 11 further comprising a transmission and receiving system for transferring data packets to a receiver.

* * * * *